United States Patent
Steffen

(10) Patent No.: US 7,044,413 B2
(45) Date of Patent: *May 16, 2006

(54) CABLE ROLLER WITH A FREQUENCY CONVERTER DEVICE

(75) Inventor: Michael Steffen, München (DE)

(73) Assignee: Wacker Construction Equipment AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/498,611

(22) PCT Filed: Dec. 18, 2002

(86) PCT No.: PCT/EP02/14498

§ 371 (c)(1),
(2), (4) Date: Jun. 10, 2004

(87) PCT Pub. No.: WO03/056675

PCT Pub. Date: Jul. 10, 2003

(65) Prior Publication Data

US 2005/0224307 A1    Oct. 13, 2005

(30) Foreign Application Priority Data

Dec. 28, 2001   (DE) ................. 101 64 304

(51) Int. Cl.
    *B65H 75/44*    (2006.01)
(52) U.S. Cl. ...................... 242/400; 191/12.4
(58) Field of Classification Search ............... 242/400, 242/588; 191/12.2 R, 12.4
    See application file for complete search history.

(56) References Cited

U.S. PATENT DOCUMENTS

| | | | | |
|---|---|---|---|---|
| 3,369,084 | A * | 2/1968 | Cook | 191/12.4 |
| 4,143,746 | A * | 3/1979 | Lowery | 191/12.4 |
| 4,282,954 | A * | 8/1981 | Hill | 191/12.4 |
| 4,520,239 | A * | 5/1985 | Schwartz | 191/12.4 |
| 4,656,320 | A * | 4/1987 | Maddock | 191/12.4 |
| D289,603 | S * | 5/1987 | An | |
| 5,657,841 | A * | 8/1997 | Morvan | 191/12.4 |
| 5,700,150 | A * | 12/1997 | Morin | 191/12.4 |
| 5,738,548 | A * | 4/1998 | Rutulante | |
| 6,223,871 | B1 | 5/2001 | Steffen | |
| 6,253,893 | B1 * | 7/2001 | Chi-Min | 191/12.4 |
| 6,758,314 | B1 * | 7/2004 | Woodruff | 191/12.2 R |
| 6,942,079 | B1 * | 9/2005 | Chang | 191/12.4 |
| 2001/0019002 | A1 * | 9/2001 | Walters et al. | 191/12.4 |

* cited by examiner

*Primary Examiner*—William A. Rivera
(74) *Attorney, Agent, or Firm*—Boyle Fredrickson Newholm Stein & Gratz S.C.

(57) ABSTRACT

A frequency converter device is integrated inside a cable roller, in such a manner that at least one socket is supplied at special frequency. The socket does not rotate when the cable is wound or unwound on the drum. Furthermore, optimal cooling is created and the frequency converter device is made of at least one frequency converter enabling a special frequency to be provided.

11 Claims, 4 Drawing Sheets

CABLE ROLLER WITH A FREQUENCY CONVERTER DEVICE

BACKGROUND OF THE INVENTION

1. Field of the Invention

The invention relates to a cable roller according to the preamble of claim 1.

2. Description of the Related Art

On building sites, for compacting concrete internal vibrators are often used, the asynchronous motors of which have to be supplied with a special voltage and a special frequency. If, for example, an asynchronous motor provided in the internal vibrator and having a connected flyweight is to reach a rotational speed of 12,000 rpm, then in the case of a double-pole machine an excitation frequency of 200 Hz is required. From the public electricity supply, however, only a frequency of 50 Hz is available.

This is why in the past frequency converters were used, which were mostly supplied with three-phase alternating current and owing to their heavy weight were very difficult to handle. Soon, by virtue of the provision of corresponding power electronics with suitable semiconductors it became possible to miniaturize the frequency converter and thereby reduce its weight from e.g. 60 kg to 4 kg. Such a lightweight frequency converter was however still connected between the terminal and a cable drum, which was necessary for bridging larger distances. Moving the terminal, e.g. the internal vibrator, to various work sites therefore also entailed moving the frequency converter and, in addition, the cable drum.

From DE 197 22 107 C1 a cable roller is known, in which a frequency converter is integrated, with the result that the cable roller and the frequency converter may be moved as a unit.

FIG. 1 shows such an arrangement with a power cable 23, which is wound on a drum 22, wherein the drum 22 is carried by a rack 25. Integrated in the drum 22 is a frequency converter 24, which supplies at least one socket-outlet 21 with a special electric frequency. Connected to the socket-outlet 21 is a known internal vibrator 20 with an asynchronous motor. Such a combination of cable drum and frequency converter however has the drawback that during take-up or pay-out of the cable the socket-outlets 21 co-rotate with the drum. Consequently, the feeder cable for the internal vibrator 20 may become twisted.

OBJECTS AND SUMMARY OF THE INVENTION

The underlying object of the invention is to indicate a cable roller having a frequency converter device, with which the handling properties of a construction site appliance in connection with the cable roller/frequency converter device combination are improved and, in particular, the cable take-up system is optimized.

The object is achieved according to the invention in the manner defined in claim 1. Advantageous developments of the invention are evident from the sub-claims.

The combining of frequency converter device and cable roller is effected according to the invention in that the frequency converter device is provided in a substantially stationary manner on the frame of the cable roller. In said case, the frame carries the frequency converter device, the frequency converter device may however conversely carry the frame. One advantage of this is the much lower inert mass of the drum, this facilitating take-up or pay-out of the power cable.

On the cable roller at least one socket-outlet supplied by the frequency converter device is provided. The electrical connection between the frequency converter device and the power cable is effected by means of at least two slipring devices. The advantage of this electrical connection is that during take-up and/or pay-out of the power cable at least one of the socket-outlets may be substantially stationary, i.e. the socket-outlet does not co-rotate, thereby resulting in improved handling of the equipment plugged in at the cable roller because this equipment no longer has to be unplugged during take-up or pay-out of the cable to prevent twisting of the feeder cable.

As the frequency converter device may comprise a plurality of frequency converters, the socket-outlets and hence construction site equipment are suppliable with different special frequencies.

It is also advantageous when components, which the various frequency converters comprise, may be combined in the frequency converter device. This means that a plurality of frequency converters may comprise the same components or subassemblies. This constructional option saves space and may be supplemented in that, depending on the style of construction, the drum, on which the power cable is wound, surrounds the frequency converter device comprising one or more frequency converters and forms at least part of a housing of the frequency converter device, or conversely the frequency converter device surrounds the drum and hence forms part of a housing of the drum.

For better protection or for improved cooling, the frequency converter device or the drum may in said case be surrounded by an additional housing wall, which is situated between the frequency converter device and the drum, wherein air for cooling purposes is situated in an interspace between the housing wall and the frequency converter device or the drum.

It is advantageous to combine the frequency converter device in such a way with the drum that the best possible cooling of the system may be achieved. The cooling may in said case be effected by purposefully providing air slits or cooling bodies on the frame or on the frequency converter device or even on the drum. A further possibility is to integrate fans or special cooling liquids in the cable roller.

As a special form of construction of the electrical connection between frequency converter device and power cable, a coupling of at least two inductors or of at least one capacitor is also conceivable. This provides possible ways of circumventing any wear phenomena at the slipring device.

Take-up and pay-out of the power cable is usually effected manually. In a particularly advantageous form of construction of the invention, take-up of the cable is effected automatically by rotation of the drum. For this purpose, the known principle of cable take-up in vacuum cleaners may be used.

BRIEF DESCRIPTION OF THE DRAWINGS

The invention is described in detail below by way of examples and with the aid of the accompanying drawings. The drawings show.

DETAILED DESCRIPTION OF THE PREFERRED EMBODIMENTS

Figure 1:
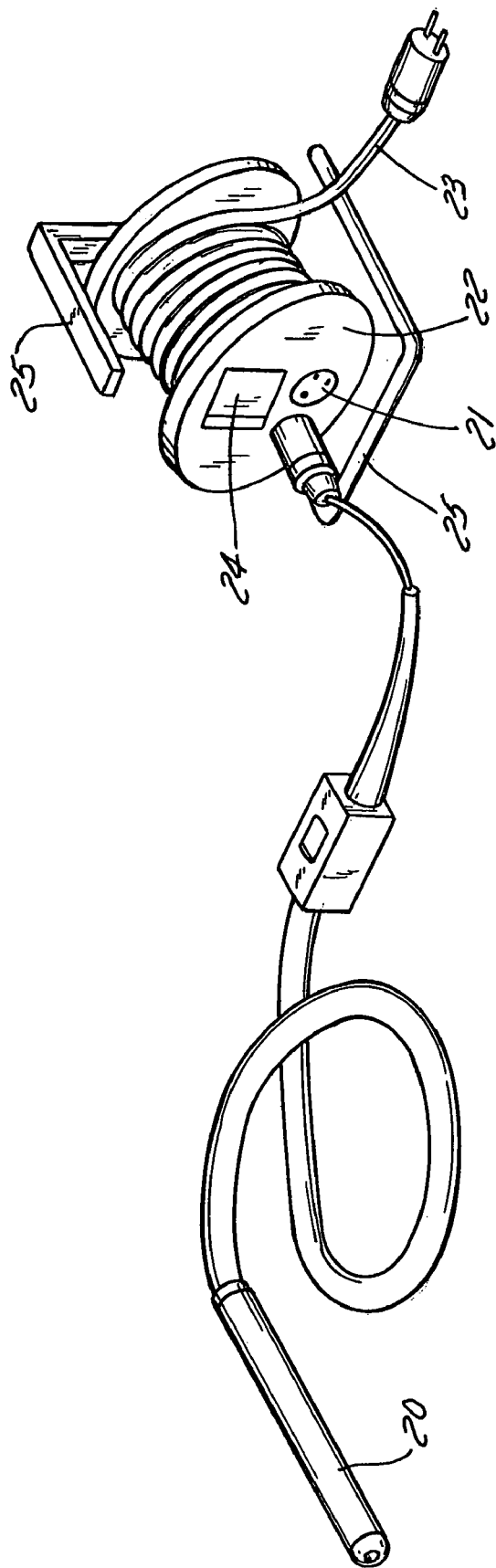
FIG. 1 a known arrangement comprising a cable roller with integrated frequency converter and a connected internal vibrator.
Figure 2:
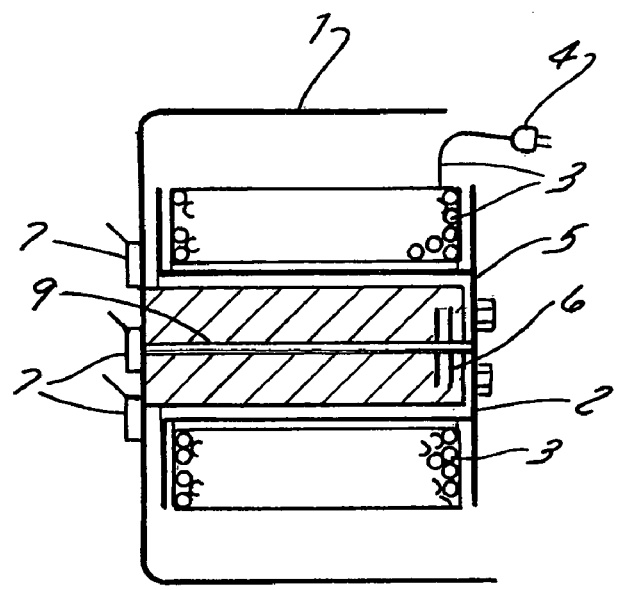
FIG. 2 a sectional side view of a first form of construction of the cable roller according to the invention.

FIG. 2 shows a sectional side view of a first form of construction of the cable roller according to the invention, having a frequency converter device 2 connected in a substantially stationary manner to a frame 1. A drum 5 is disposed around the frequency converter device 2 and mounted rotatably about an axis 9. Wound on the drum 5 is a power cable 3, which is electrically connected to the frequency converter device 2 by at least two slipring devices 6.

In this embodiment, the drum 5 may form at least part of the housing of the frequency converter device 2. In said case, the frequency converter device 2 is protectively surrounded by the drum 5. It is however also conceivable, as is correspondingly illustrated in FIG. 2, for the frequency converter device 2 to be surrounded by an independent housing, wherein air is situated between the housing and the drum 5 in order to improve the cooling of the frequency converter device 2.

The connection to the power supply is effected by means of a power plug 4 provided on the end of the power cable 3. The slipring devices 6, by which the electrical connection is established between the frequency converter device 2 and the power cable 3, are seated on the axis of rotation 9. It is however also conceivable for the slipring devices 6 to be connected in a fixed manner to the frequency converter device 2 and for the axis of rotation 9 to rotate centrically in the slipring devices 6. The frequency converter device 2 supplies the socket-outlets 7, which are fastened to the frame 1, with at least one special frequency, i.e. socket-outlets supplying different special frequencies are also conceivable.

Figure 3:
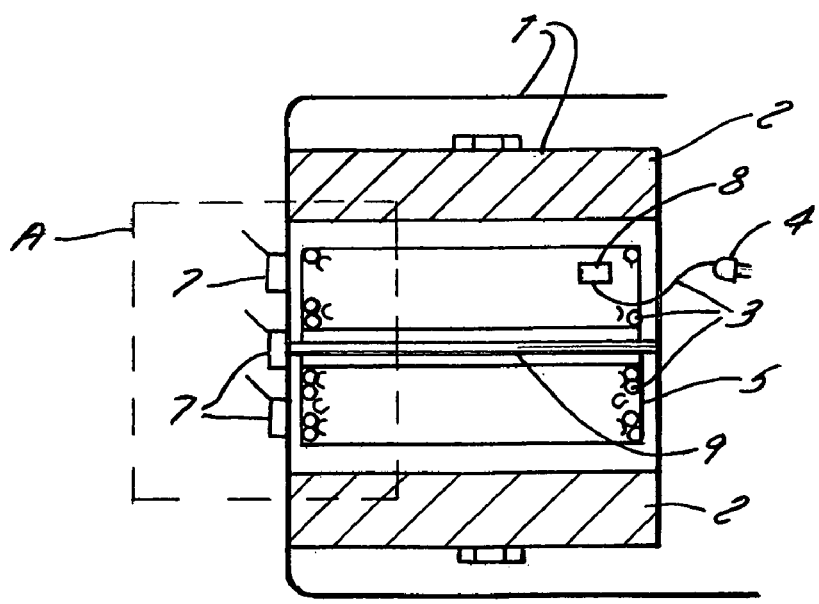
FIG. 3 a sectional side view of a second form of construction of the cable roller according to the invention.

FIG. 3 shows the side view of a second form of construction of the cable roller according to the invention having the frequency converter device 2 connected in a substantially stationary manner to the frame 1. In this embodiment, the frequency converter device 2 forms at least part of the housing of the cable roller. The frequency converter device 2 surrounds the drum 5, on which is wound the power cable 3, which is run to the outside through a cable gland 8 that penetrates the frequency converter device 2.

The connection to the power supply is again effected by means of the power plug 4, The drum 5 is seated on the axis of rotation 9 and freely rotatable about said axis of rotation 9. Depending on the form of construction of the cable roller, the cable 3 may be taken up by the drum 5 automatically, e.g. in accordance with the known principle of cable take-up in vacuum cleaners. The, in principle, known mechanism required for this purpose is not shown in FIG. 3. The connection between the frequency converter device 2 and the cable 3 is again effected by means of a non-illustrated double slipring device. For the socket-outlets 7 and the connection between the power cable 3 and the frequency converter device 2, the same applies as was stated with regard to FIG. 2.

Figure 4:
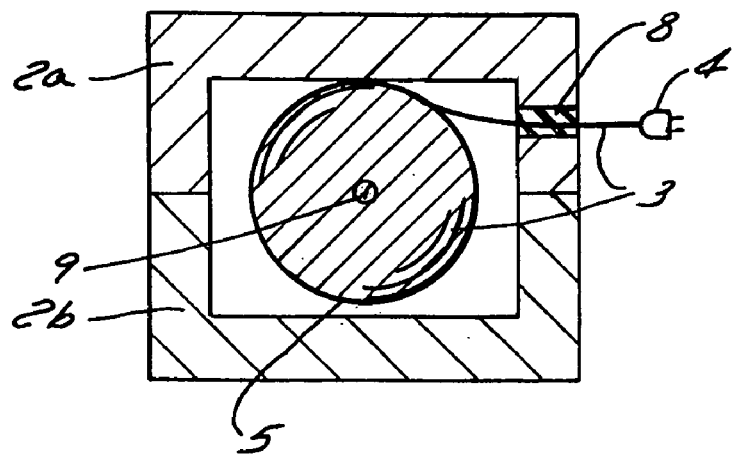
FIG. 4 a front view in section of a third form of construction of the cable roller similar to FIG. 3 having a frequency converter device, which comprises two frequency converters.

FIG. 4 shows in section the front view of a third form of construction of the cable roller similar to FIG. 3. The intention here is to make it clear that the frequency converter device 2 may comprise two frequency converters 2a, 2b, which supply different special frequencies.

Figure 5:
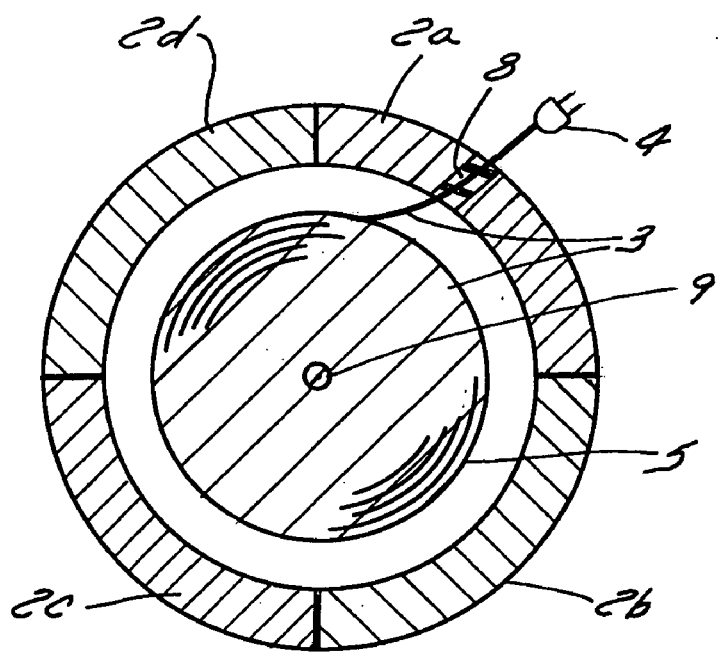
FIG. 5 a front view in section of a fourth form of construction of the cable roller similar to FIG. 3 having a frequency converter device, which comprises a plurality of frequency converters.

FIG. 5 shows in section a front view of a fourth form of construction of the cable roller corresponding to FIG. 3. In this case, however, a plurality of frequency converters 2a, 2b, 2c, 2d are arranged in the shape of a ring.

Figure 6:
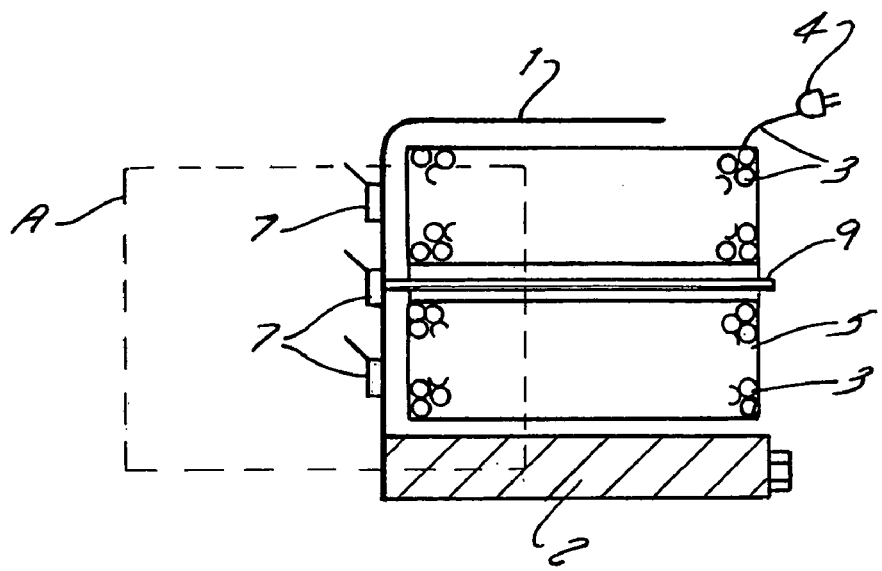
FIG. 6 a side view of a fifth form of construction of the cable roller according to the invention.

FIG. 6 shows the side view of a fifth form of construction of the cable roller according to the invention having a frequency converter device 2, which is connected in a substantially stationary manner to the frame 1 but in this case, as a base plate, carries the frame 1 and the remainder of the cable roller. The drum 5 is again mounted rotatably on the axis of rotation 9. The axis of rotation 9 is connected in a fixed manner to the frame 1. For the socket-outlets 7 and the connection between power cable 3 and frequency converter device 2, the same applies as was described in connection with FIG. 2.

Figure 7:
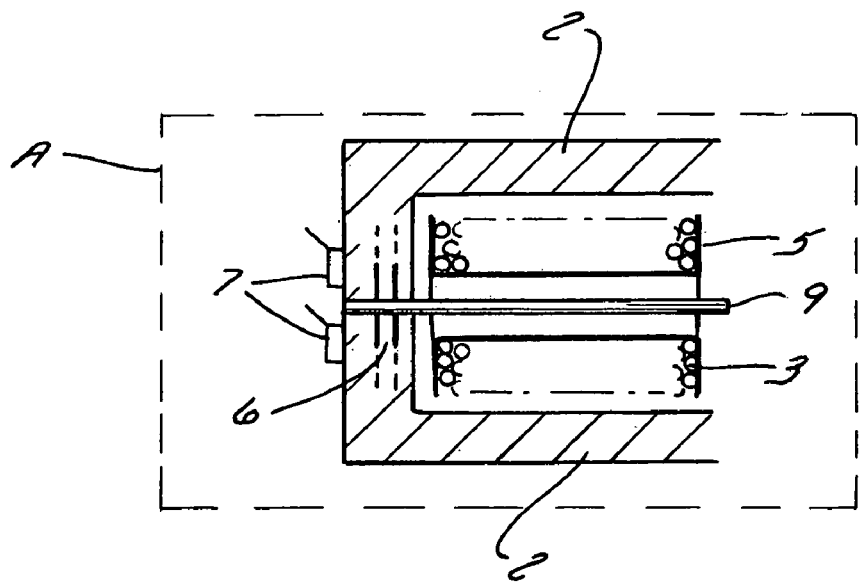
FIG. 7 a detail A from the side view of FIG. 3 and FIG. 6.

FIG. 7 shows a variant of the form of construction according to FIG. 3. According to FIG. 7, two slipring devices 6 are provided, via which the electric current may be transferred from the power cable 3 wound on the drum 5 to the frequency converter device 2 and finally to the socket-outlets 7. The slipring devices 6, which are arrangeable at various points, are used to transfer current from a rotating part (in FIG. 7: drum 5 with power cable 3) to a stationary part (frequency converter device 2 or/and frame 1).

As an alternative to the slipring devices, the electric current may be transferred instead by means of suitably disposed inductors or even with the aid of a capacitor arrangement. This depends, however, upon the power rating.

The invention claimed is:

1. A cable roller, comprising:
   a frame,
   a frequency converter device for alternating electric current, the frequency converter device being fastened to the frame and converting an input frequency of a line current into at least one output frequency of a special current that has a different frequency than the frequency of the input frequency,
   a power cable which supplies the frequency converter device with the line current and which is electrically connected to the frequency converter device,
   a drum which is mounted rotatably relative to the frame and on which the power cable is windable,
   wherein the frequency converter device is provided in an at least substantially stationary manner on the frame.

2. The cable roller according to claim 1, further comprising at least one socket-outlet supplied by the frequency converter device.

3. The cable roller according to claim 2, wherein the socket-outlet is stationary during rotation of the drum.

4. The cable roller according to claim 1, wherein the drum surrounds the frequency converter device and forms at least part of a housing of the frequency converter device.

5. The cable roller according to claim 4, wherein the frequency converter device is surrounded at least partially by a housing wall which is situated between the frequency converter device and the drum, and wherein air for cooling purposes is situated in an interspace between the housing wall and the drum.

6. The cable roller according to claim 4, wherein the drum is surrounded at least partially by a housing wall which is situated between the frequency converter device and the drum, and wherein air for cooling purposes is situated in an interspace between the housing wall and the frequency converter device.

7. The cable roller according to claim 1, wherein the frequency converter device surrounds the drum and forms at least part of a housing of the drum.

8. The cable roller according to claim 1, wherein the electrical connection between the frequency converter device and the power cable is realized via at least two slipring devices.

9. The cable roller according to claim 1, further comprising a cooling device is for cooling the frequency converter device.

10. The cable roller according to claim 1, wherein the frequency converter device comprises one or more frequency converters.

11. The cable roller according to claim 1, wherein the frame forms a rack for carrying the drum.

* * * * *